United States Patent [19]
Andrews

[11] Patent Number: 4,536,835
[45] Date of Patent: Aug. 20, 1985

[54] DIRECT A.C. TO A.C. CONVERTER CONTROLLED BY A DATA PROCESSOR

[75] Inventor: Peter J. Andrews, Northants, United Kingdom

[73] Assignee: Texas Instruments Incorporated, Dallas, Tex.

[21] Appl. No.: 456,211

[22] Filed: Jan. 7, 1983

[30] Foreign Application Priority Data

Jan. 13, 1982 [GB] United Kingdom ............... 8200897

[51] Int. Cl.³ .......................................... H02M 5/293
[52] U.S. Cl. .................................................. 363/163
[58] Field of Search ............... 363/159, 163; 318/800, 318/811

[56] References Cited

U.S. PATENT DOCUMENTS

| | | |
|---|---|---|
| 3,585,489 | 6/1971 | Pelly . |
| 4,070,605 | 1/1978 | Hoeppner ........................ 307/354 |
| 4,337,429 | 6/1982 | Stuart .............................. 318/811 |
| 4,468,725 | 8/1984 | Venturini ........................ 363/160 |

FOREIGN PATENT DOCUMENTS

| | | |
|---|---|---|
| 2048588 | 12/1980 | United Kingdom ............... 363/163 |
| 2065389 | 6/1981 | United Kingdom . |
| 2067030 | 7/1981 | United Kingdom . |
| 1600512 | 10/1981 | United Kingdom . |

OTHER PUBLICATIONS

Dewan et al., "A Microprocessor Based Controller for a Three Phase Controlled Rectifier Bridge," Conference IEEE-IAS, pp. 812-817, 1981 Annual Mtg., Philadelphia, Pa., (USA), Oct. 5-9, 1981.

Tso et al., "Dedicated-Microprocessor Scheme for Thyristor Phase Control of Multiphase Convertors," IEE Proceedings, vol. 128, Pt. B, No. 2, pp. 101-108, Mar. 1981.

Primary Examiner—William H. Beha, Jr.
Attorney, Agent, or Firm—N. Rhys Merrett; Mel Sharp

[57] ABSTRACT

A direct AC to AC supply converter in which the control of the bidirectional switches connecting each conductor of a polyphase input supply to each conductor of an output supply is effected by a data processor, the operation of the program of which is synchronized by interrupt with the input supply. The data processor calculates for each output phase 2 values representing pulse widths out of a repeating sequence of 3 (for three phase input and output supplies) and pulse generators produce 3 abutting width modulated pulses in a constant period much shorter than the periods of the supplies. The interrupt operates a software phase locked loop. The pulse generators include an interlock circuit ensuring that the width modulated pulses do not overlap and an overload detector responsive to the turn-on times of the switches. A default logic circuit responsive to hardware or software failure makes the width modulated pulses of equal duration.

20 Claims, 10 Drawing Figures

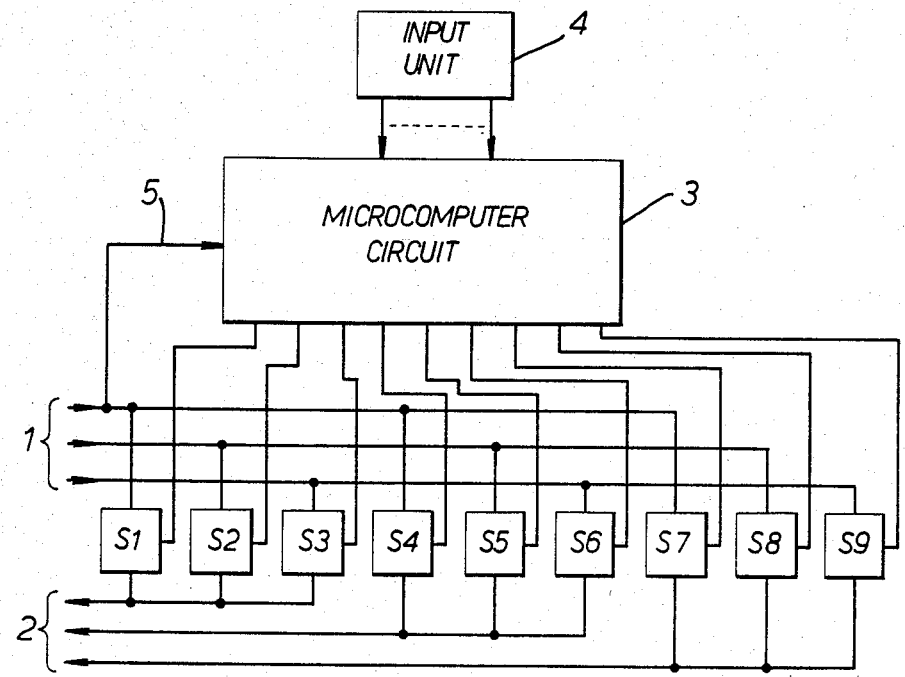
FIG. 1.
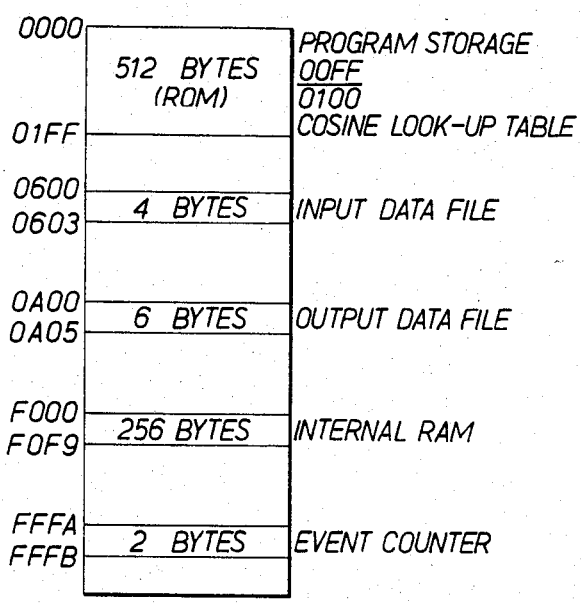
FIG. 7.
| 0600 | $\phi$ |
| 0601 | q |
| 0602 | FREQ. CONT. MSB |
| 0603 | FREQ. CONT. LSB |
FIG. 8.

DIRECT A.C. TO A.C. CONVERTER CONTROLLED BY A DATA PROCESSOR

This invention relates to a direct a.c. supply converter, that is a converter in which an alternating current power supply input is converted into an alternating current power supply output having different characteristics from the input supply without passing through an intermediate direct current stage.

A direct a.c. power converter is described and claimed in U.S. patent application Ser. No. 390,000 (issued Aug. 28, 1984 as U.S. Pat. No. 4,468,725) assigned to the assignee of the present application and incorporated herein by reference. That converter uses a matrix of bi-directional switches having contiguous width-modulated conduction periods to connect the phases of a poly-phase a.c. input supply to output conductors to synthesize the output supply. The switches are operated in a cycle of much higher frequency than the supply frequencies in such a way that each output conductor is connected to only one of the input conductors at a time. A potential difficulty in the operation of this converter is that the generation of the control signals for the switches involves calculations dependent on the phases of the supplies which means that alteration of the characteristics of the output supply may be complicated.

An object of the present invention is to provide an improved a.c. supply converter in which the above difficulty is largely overcome.

According to the present invention there is provided an a.c. supply converter having input conductors for a balanced polyphase a.c. input supply system, output conductors for an a.c. output supply system, a plurality of bidirectional switches which individually connect each input conductor to each output conductor, and a control system connected to operate the switches by a repeating sequence of abutting width modulated pulses, there being the same number of pulses in the sequence as there are phases in the input supply, in such a way that each phase of the input supply is connected in turn to each phase of the output supply and that at any instant one and only one of the switches connected to each of the output conductors is closed, wherein the control system includes a data processor means programmed to produce a sequence of values representing the widths of the modulated pulses, pulse generator means responsive to the values to produce the width modulated pulses and apply them to the switches, and means connected to the input conductors to derive therefrom signals indicative of the phase of the a.c. input supply, which signals are applied to the data processor means to influence the sequence of values generated. For example, the phase indicative signals may be applied to the data processor means as a time reference for matching the timing of the sequence of the pulses generated to the input supply.

The signals indicative of the phase of the a.c. input supply may be derived in response to the voltage of the supply crossing a particular level, such as zero, and may be applied to an interrupt input of the data processor means to initiate a program for synchronizing the operation of the data processor means with the time of the crossing. The synchronizing program may be a software phase locked loop.

The pulse generator means may include means for monitoring the conductive states of the bidirectional switches and a circuit for interlocking the operation of the switches so that the turning on of a switch coincides with the turning off of the preceding switch. In the case of an overload on the output circuit the bidirectional switches may be unable to be fully turned on and the pulse generators may have an overload detection circuit which compares the period of time taken for each switch to turn on fully with a preset value and if that time is exceeded turns off all the switches.

A default logic circuit may be provided for feeding equal values to the pulse width modulators should the data processor means suffer a hardware or software failure preventing the correct operation of the pulse width modulators. When this happens the output voltage is zero.

Although a converter according to the invention is generally useful for providing an output a.c. supply of selected voltage, frequency, relative phase or number of phases from an at least 3-phase input supply, it is particularly applicable to the speed control of an induction motor.

The control system described uses a data processor working on-line to provide values representing the pulse widths which are utilised as they are generated to control the pulse width modulators. In an alternative arrangement the data processor may be arranged to calculate the values in advance for a whole cycle, which values are then stored and used as required, the computer updating the values whenever a change is required.

In order that the invention may be fully understood and readily carried into effect an embodiment will now be described with reference to the accompanying drawings, of which:

FIG. 1 is a block diagram of the embodiment of the invention;

Figure 2:
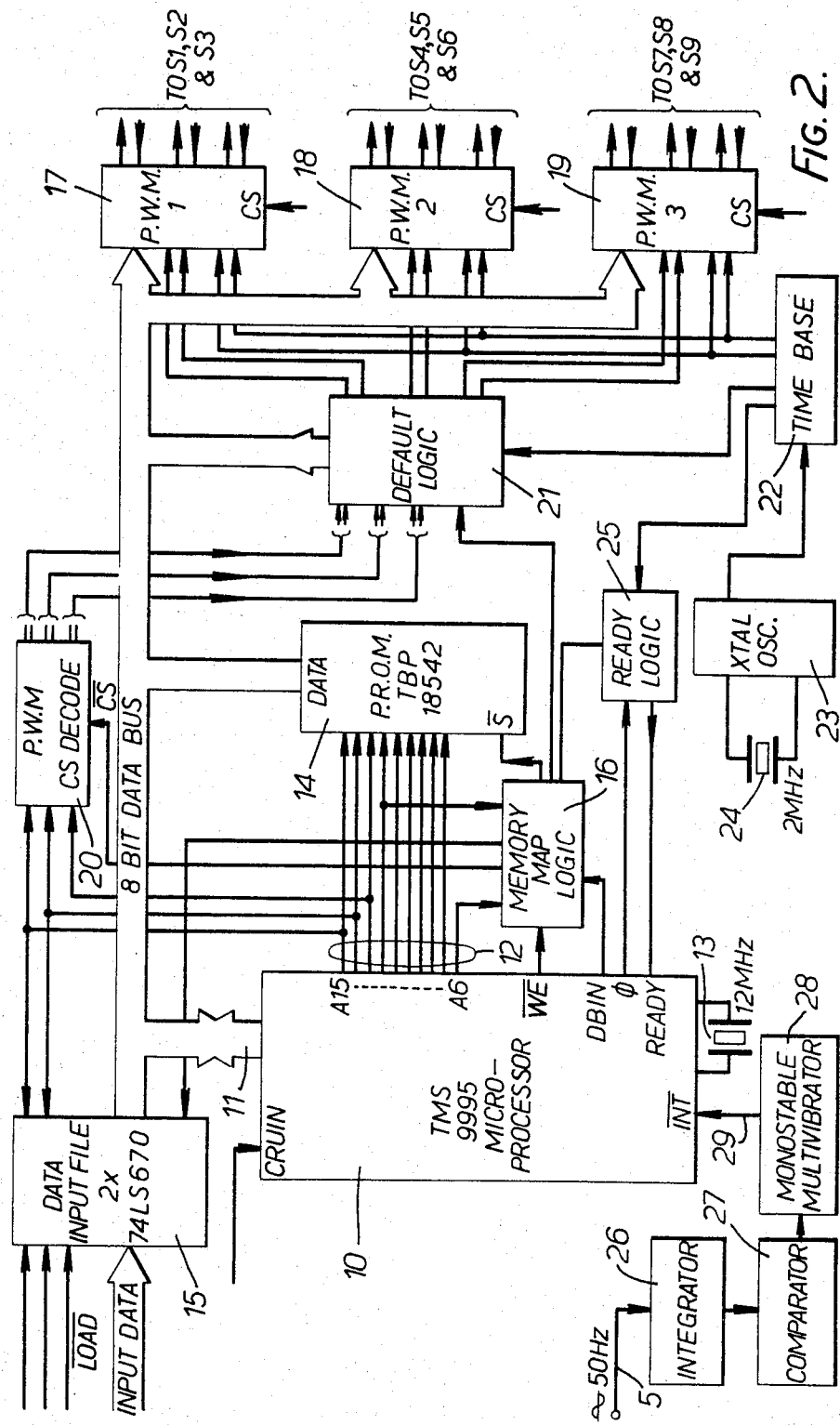
FIG. 2 is a circuit of the microcomputer circuit of FIG. 1.
Figure 3:
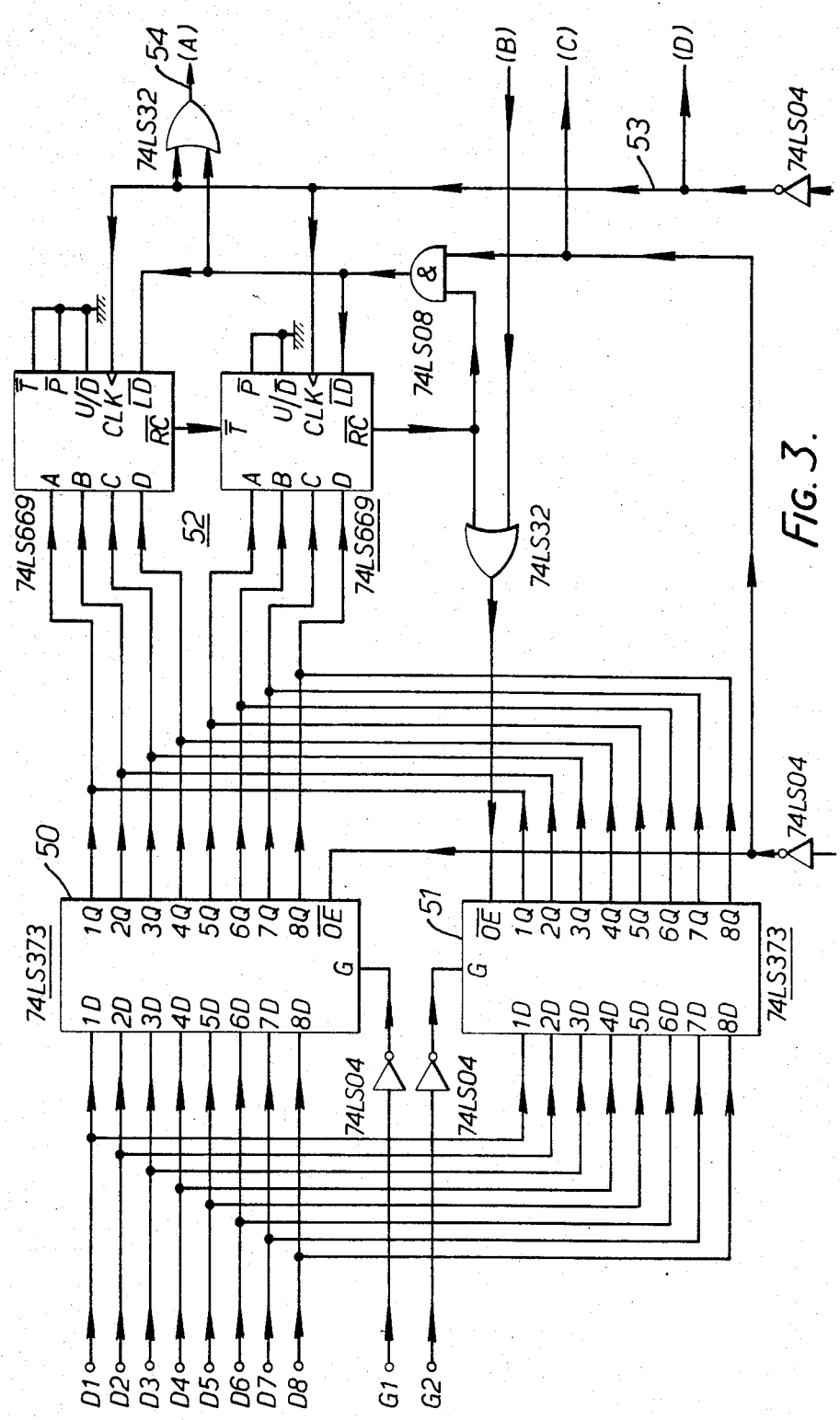
Figure 4:
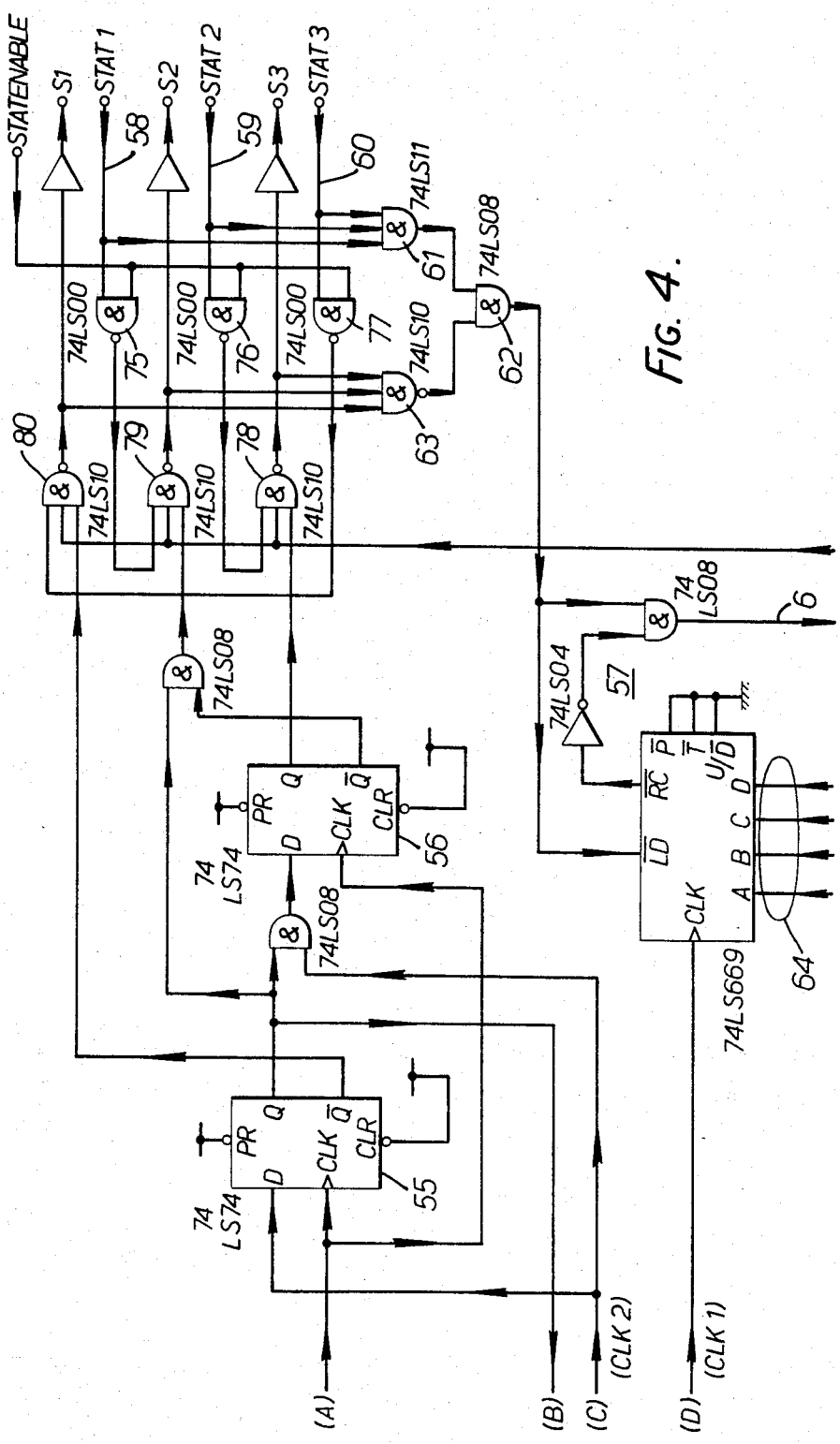
Figure 5:
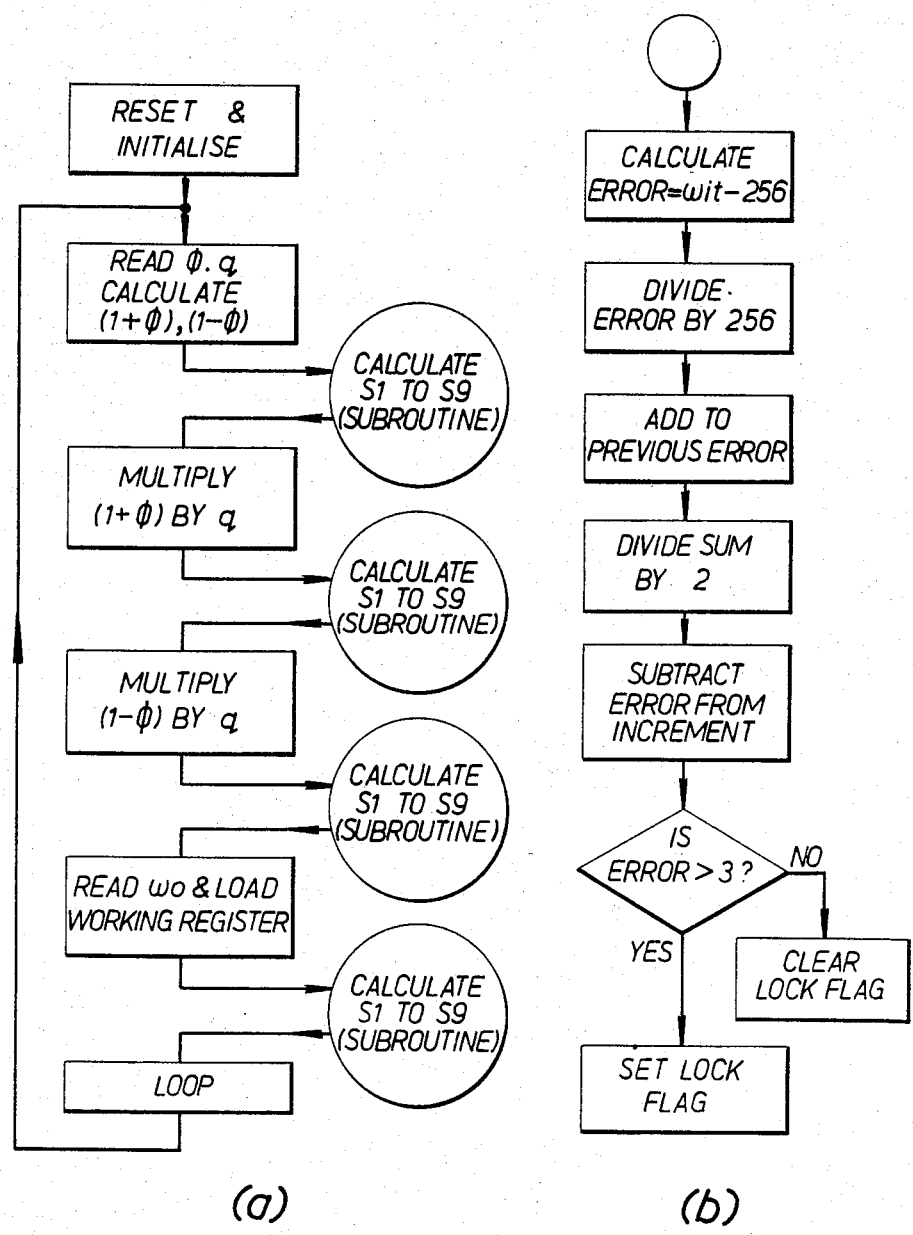
Figure 6:
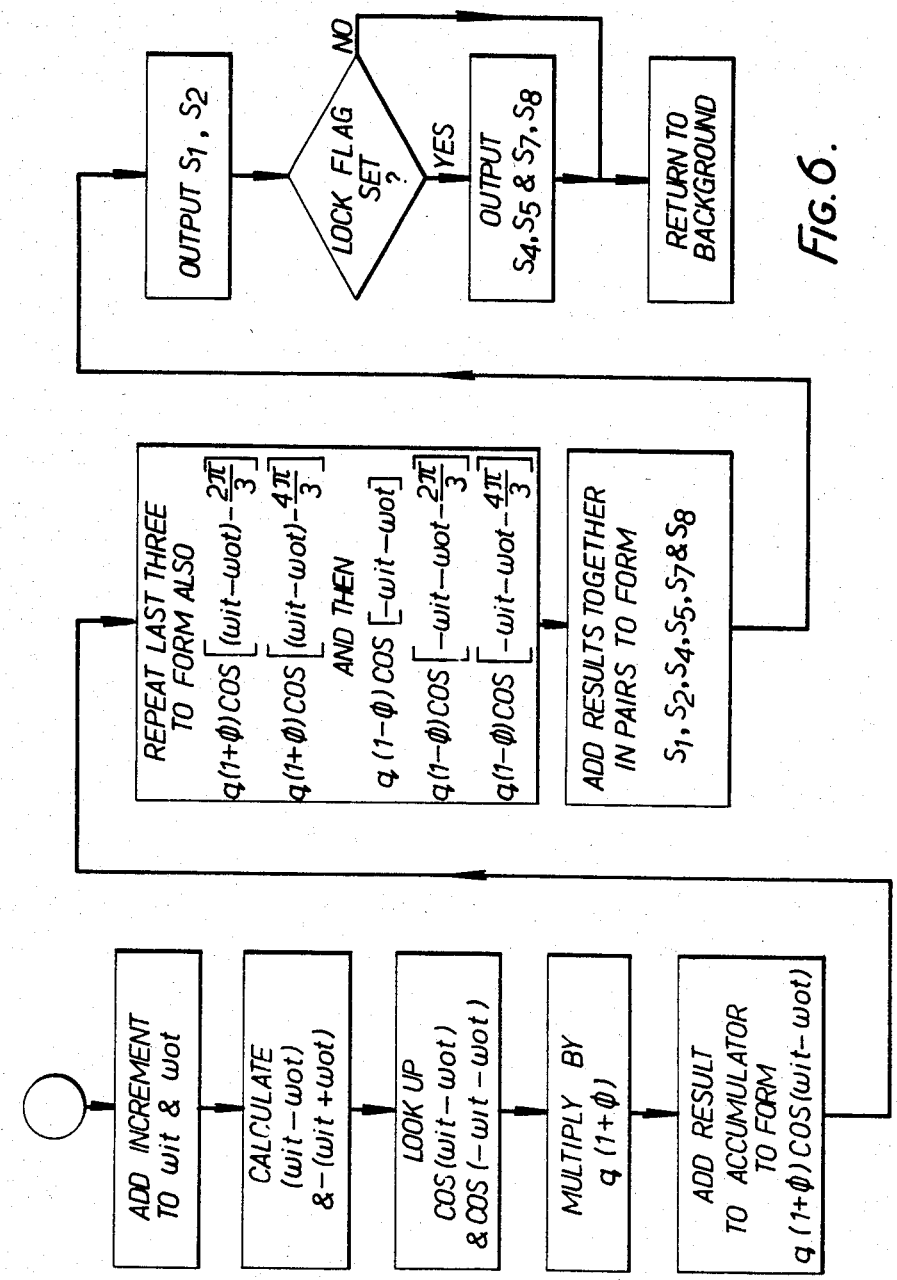

FIGS. 3 and 4 together show a circuit diagram of each pulse width modulator of FIG. 2;

FIGS. 5(a), 5(b) and 6 are flow diagrams of the microcomputer program;

FIG. 7 shows the memory map of the microcomputer;

FIG. 8 shows details of the input data file; and

Figure 9:
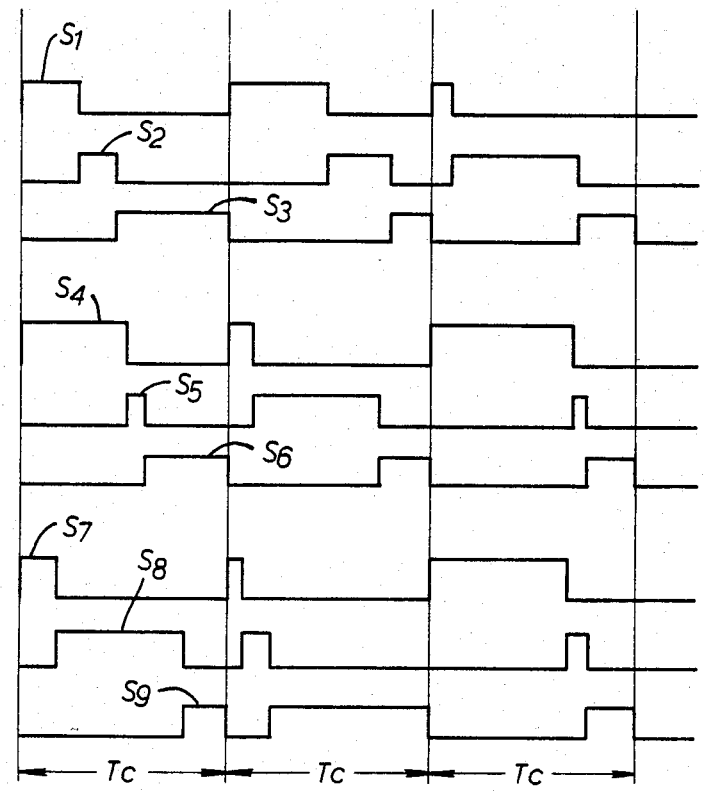

FIG. 9 shows examples of the waveforms applied to the switches.

Reference will also be made to Table 1 which shows the program of the microcomputer in detail. The program is written in the assembly code of the microprocessor type TMS 9995 which is the microprocessor used in the embodiment of the invention to be described. The reader is referred to the data manual for this device to enable him to follow the operations performed by the program and to determine the operation codes for the program.

The embodiment of the invention as shown in FIG. 1 is for converting a 3-phase input supply into a 3-phase output supply, the converter controlling the phase amplitude and frequency of the output supply. The input supply is applied via conductors 1 to nine switches S1 to S9 in groups of three as shown and the output supply appears on conductors 2. The operation of the switches is performed in accordance with the principles described in U.S. Pat. No. 4,468,725 by a microcomputer circuit 3. Input values indicative of the phase, amplitude and frequency required of the output supply are applied via an input unit 4 to the microcomputer circuit 3. In order that the microcomputer circuit 3 can perform its calculation on the basis of the phase and frequency of the input supply, one predetermined phase of this supply is applied to the circuit 3 via a conductor 5. The microcomputer circuit 3 will be described later with reference to FIGS. 2, 3 and 4 and its program with reference to FIGS. 5, 6, 7 and 8. The switches S1 to S9 may for example take any of the transistorized forms described and illustrated in FIGS. 12, 16, 17, 18 or 19 of U.S. Pat. No. 4,468,725.

The microcomputer circuit includes a microprocessor of type TMS 9995 manufactured by Texas Instruments, and the reader is directed to the data manual for this device to improve his understanding of the operation of the circuit to be described. The microprocessor carries the reference 10 and has its eight parallel data terminals connected to the 8-bit data bus 11. The device 10 has sixteen address connections of which ten are connected to an address bus 12. The remaining address terminals are not used in this application. The device 10 has a built in oscillator to which a 12 MHz crystal 13 is connected, which oscillator provides the pulses for the operation of the device 10. A programmable read only memory (PROM) 14 is connected to the data bus 11 and the address bus 12 and provides not only the program for the operation of the device 10 but also a look-up table of cosines, the values of which are used in the calculations performed by the device 10. The input data is applied to the circuit via a buffer store 15, which is connected to both data and address buses 11 and 12. A memory map logic circuit 16 is connected to the address bus and to the PROM 14 and the buffer store 15 to provide chip select signals for those components in accordance with the allocation of memories used in the circuit. Three pulse width modulators 17, 18 and 19 are connected to the data bus 11 to receive values representing the widths of pulses to be applied to the switches S1 to S9 to produce the required output supply in accordance with the principles described in U.S. Pat. No. 4,468,725. The modulator 17 has outputs connected to switches S1, S2 and S3, the modulator 18 has outputs connected to switches S4, S5 and S6, the modulator 19 has outputs connected to switches S7, S8 and S9. The addressing of the modulators 17, 18 and 19 is effected by a decoder circuit 20 connected to the address bus 12, which decoder has outputs respectively for the modulators 17, 18 and 19 which are applied to those modulators via a default logic circuit 21 which operates as described below to override the control of the modulators 17, 18 and 19 by the device 10 in the event of a breakdown which could lead to damage of the switches S1 to S9 or of the devices driven by the output of the converter. The default logic unit 21 is connected to the data bus 11 and receives timing pulses from a time bus 22, which also supplies the timing pulses for the pulse width modulators 17, 18 and 19. The time bus 22 is driven by a crystal oscillator 23 controlled by 2 MHz crystal 24. A ready logic circuit 25 is connected to the device 10, the memory logic 16 and the time bus 22 to derive an indication of when the circuit timing is synchronised and provide an indication of this state to the device 10.

Since the calculations to be performed by the device 10 depend on the phase and frequency of the input supply, a sample of the input supply derived from one of the conductors 1 (FIG. 1) via a conductor 5 is applied to an integrator 26, the output of which is connected to a comparator 27 and thence to a monostable multivibrator 28. The integrator 26 not only provides a 90° phase shift so that zero crossings detected by the comparator 27 coincide with input voltage peaks which is desirable because of the use of cosines in the calculations, but also confers a measure of noise immunity to the circuit. The multivibrator 28 applies interrupt pulses to the device 10 via a conductor 29 to operate a software phase locked loop included in the program of the device 10.

Before describing the calculations performed by the program, the functions of the various parts of the microcomputer circuit shown in FIG. 2 will be discussed. The device 10 reads input data from the buffer store 15, which data represents the voltage, frequency and phase required of the output supply. For a given output supply the phase of the switching signals will clearly depend on the phase of the input supply and it is for this reason that the operation of the device 10 is synchronised with a phase of the incoming supply. Similarly, the output voltage of the converter will depend on the input voltage and the representations of the output voltage takes the form of the relationship of the output voltage to the input voltage. The frequency control data represents the actual output frequency, but, as will be evident from a consideration of the calculations to be described, the device 10 requires an indication of the input supply frequency in order to calculate the pulse widths. This input supply information is derived from the input supply by means of the software phase locked loop.

The PROM 14 operates in a conventional manner to provide the program information for the device 10 and the program makes use of the internal registers provided. If another type of microprocessor is employed, then it may be necessary to provide some random access memory to enable the program to be performed. The program of the device 10 causes it to address the buffer store 15 when input data is required and to address the pulse width modulators 17, 18 and 19 via the decoder 20 when output values have been calculated.

The pulse width modulators 17, 18 and 19 are of the same construction and each consists of the circuitry shown in detail in FIGS. 3 and 4. The data bus 11 is connected to two 8-bit latches 50 and 51 which are selected alternately by decoding of the address data on the bus 12 (FIG. 2). The values stored in the latches 50 and 51 are transferred to a counter 52 formed of two chips, and pulses of a constant frequency are applied via a conductor 53 to the counter 52 to cause it to count down to zero, an operation which takes a period of time depending on the value transferred into the counter from one of the latches. The end of this period is indicated by a pulse on conductor 54 which is applied to latches 55 and 56, the outputs of which are combined logically to effect the application of the width modulated pulse output of the latches in turn to the three switches to which the particular modulator is connected. The modulator in addition to including the circuitry for producing the width modulated pulses also includes a programmable timing counter 57, the purpose of which is to detect an overload of the switches. This circuit receives state signals from the three switches via conductors 58, 59 and 60, which are directed via gates 61 and 62 to the counter 57. When a switch is driven a pulse is transmitted via a gate 63 and the gate 62 which starts the counter 57 and if the state indication from the switch does not indicate that the switch has changed state within a predetermined time set by a number applied to the counter 57 via conductors 64, then this is assumed to be due to the overloading of the switches, for example, due to a short-circuit, and the circuit produces a trip output to block further conduction of the switches.

The state inputs from the switches are also used to ensure that there is no overlap in the conduction apparatus of the switches by holding off the application of a turning on signal to one switch until the preceding switch is turned off. This function is achieved by the gates 75 to 80.

In the pulse width modulators only two data latches 50 and 51 are required because the on time of the three switches connected to each modulator always adds up to a constant interval with the result that only two on times need be specified in each cycle of control of the switches. The period of this cycle of control is determined by signals applied to the modulator from the time base 22 and is typically between 50 and 200 μs. The operation of the modulator is such that the first switch on-time is stored in the latch 50, the second switch on-time in the latch 51 and the third switch on-time occupies the remainder of the period before the next pulse from the time base 22 via a conductor 81. During the respective switch off times the latches 50 and 51 receive the next input values for the next cycle. The maximum duration of the on-time of any switch is two-thirds of the total cycle period, and this means that at least one-third of the cycle period is available for updating each latch. If the values are not loaded into the latches 50 and 51 during this time, the default logic 21 is arranged to override the control of the modulators by the microprocessor 10 and automatically loads the latches 50 and 51 with values representing one-third of the cycle period which has the effect of making the output voltage of the converter equal to zero. This default logic serves to protect the load whilst the converter is coming into synchronism and, in the event of failure of the microprocessor or a crash of its program. The synchronisation of the program of the processor to the loading times for the loads is achieved by the use of the READY signal provided by the ready logic 25. If the microprocessor 10 completes the calculation routine before this time occurs and is ready to perform a memory write to the pulse width modulator, the ready logic 25 applies a signal to the device 10 which causes it to enter an extended wait state until the ready logic 25 output indicates that the time for loading the value has come. The use of the ready logic in this way has the effect that after a few cycles the timing becomes stabilised, so that the processor enters a wait state on each cycle halting program execution until the calculated values can be loaded into the latches. Immediately after the loading has been effected, the processor 10 resumes the calculations for the next switch interval. The transfer of data requires much less time than is provided by the one-third of the cycle period, so that, if necessary, the transfer can be delayed allowing for interruption of the calculation, for example, to perform the phase locking with the input supply.

As shown in FIG. 2, the default logic 21 transmits the address signals for the pulse width modulators 17, 18 and 19 from the decoder 20. The logic 21 includes six latches respectively connected to the six address lines and are set when the corresponding sets of latches in the pulse width modulators are addressed. A gate is provided in the default logic to produce an output if at the end of a cycle all of the latches have not been set. Any failure to address one of the sets of latches in the pulse width modulators will be detected by this arrangement and is used to initiate the fail-safe override to avoid damage to the switches or the load device.

Turning now to the program to be performed by the microprocessor, consideration will first be given to the calculations to be performed in generating the values representing the required pulse widths. From the above-mentioned U.S. Pat. No. 4,468,725, the theory for the operation of a 3-phase to 3-phase converter can be described in the following terms.

Given a set of input sinusoidal voltages at input frequency:

$$\begin{cases} V_{i1} = v_i\cos(\omega_i t) \\ V_{i2} = v_i\cos\left(\omega_i t + \frac{2}{3}\pi\right) \\ V_{i3} = v_i\cos\left(\omega_i t + \frac{4}{3}\pi\right) \end{cases},$$

and a set of output sinusoidal currents at output frequency:

$$\begin{cases} I_{01} = c_0\cos(\omega_0 t + \phi_0) \\ I_{02} = c_0\cos\left(\omega_0 t + \frac{2}{3}\pi + \phi_0\right) \\ I_{03} = c_0\cos\left(\omega_0 t + \frac{4}{3}\pi + \phi_0\right) \end{cases},$$

determine a control law for the switches $S_{11}, S_{12}, \ldots, S_{33}$ so that the low frequency parts of the synthetized output voltages $V_{o1}, V_{o2}, V_{o3}$, and input currents $I_{i1}, I_{i2}, I_{i3}$ are sinusoidal with the prescribed output frequency, input frequency, phase and amplitude respectively.

Let now the desired input currents and output voltages be:

$$\begin{cases} I_{i1} = c_i\cos(\omega_i t + \phi_i) \\ I_{i2} = c_i\cos\left(\omega_i t + \frac{2}{3}\pi + \phi_i\right) \\ I_{i3} = c_i\cos\left(\omega_i t + \frac{4}{3}\pi + \phi_i\right) \end{cases}$$

$$\begin{cases} V_{01} = v_0\cos(\omega_0 t) \\ V_{02} = v_0\cos\left(\omega_0 t + \frac{2}{3}\pi\right) \\ V_{03} = v_0\cos\left(\omega_0 t + \frac{4}{3}\pi\right) \end{cases}.$$

According to the existence theorem, the output voltage and input current high frequency synthesis are possible, in this case, only if:

$$v_o \leq v_i/2 \text{ and } c_i \leq c_o/2.$$

Furthermore, it is required that:

$$\frac{v_o}{v_i} = \frac{c_i}{c_o} \cdot \frac{\cos\phi_i}{\cos\phi_o},$$

Within these limitations, a solution of the system of equations is the following generalized transformer low frequency modulation matrix m(t):

$$\frac{1}{3}\alpha_1 \begin{pmatrix} 1 + 2q\,CS(0) & 1 + 2q\,CS\left(-\frac{2}{3}\pi\right) & 1 + 2q\,CS\left(-\frac{4}{3}\pi\right) \\ 1 + 2q\,CS\left(-\frac{4}{3}\pi\right) & 1 + 2q\,CS(0) & 1 + 2q\,CS\left(-\frac{2}{3}\pi\right) \\ 1 + 2q\,CS\left(-\frac{2}{3}\pi\right) & 1 + 2q\,CS\left(-\frac{4}{3}\pi\right) & 1 + 2q\,CS(0) \end{pmatrix} +$$

$$\frac{1}{3}\alpha_2 \begin{pmatrix} 1 + 2q\,CA(0) & 1 + 2q\,CA\left(-\frac{2}{3}\pi\right) & 1 + 2q\,CA\left(-\frac{4}{3}\pi\right) \\ 1 + 2q\,CA\left(-\frac{2}{3}\pi\right) & 1 + 2q\,CA\left(-\frac{4}{3}\pi\right) & 1 + 2q\,CA(0) \\ 1 + 2q\,CA\left(-\frac{4}{3}\pi\right) & 1 + 2q\,CA(0) & 1 + 2q\,CA\left(-\frac{2}{3}\pi\right) \end{pmatrix}$$

where:

$CS(x) = \cos[\omega_M t + x]$ $CA(x) = \cos[-(\omega_M + 2\omega_i)t + x]$ $\omega_M = \omega_o - \omega_i$ $\alpha_1 = \frac{1}{2}[1 + \tan(\phi_i)\cdot\cot(\phi_o)]$ $\alpha_2 = 1 - \alpha_1 = \frac{1}{2}[1 - \tan(\phi_i)\cdot\cot(\phi_o)]$ $q = v_o/v_i$ with:

$\alpha_1 \geq 0$ $\alpha_2 \geq 0$

In the particular embodiment, the input data is as follows:
Output frequency: 12-bit word, say 0 to 1000 Hz = $f_o$
Output amplitude: 8-bit word, range 0 to 0.5 = q
Input-Output phase transfer: 5-bit word (4 bits + sign), range $-1$ to $+1 = \phi_*$
Output Phase Set (optional, not in this implementation): 8 bit-word, range 0 to $2\pi/3 = \phi_o$ The input voltage frequency and phase must be obtained from the supply. This is achieved by taking zero crossings in the comparator 27 which causes pulses to be produced by the multivibrator 28 applied as interrupts via conductor 29 to the microprocessor 10.

Input voltage = $V_i$; Output voltage = $V_o$; so that $q = V_o/V_i$

Input frequency = $f_i$ and Output frequency = $f_o$ and $\omega_i = 2\pi f_i$; $\omega_o = 2\pi f_o$.

The input data file is shown in FIG. 8 and indicated in FIG. 7. Each memory location indicated is of 1 byte, that is to say 8 bits. The values stored represent $\phi_o$, the output phase set value, q and a frequency control value occupying 2 bytes. The value stored in these bytes has 14 significant bits and is a twos complement value in the range 2001 to 1FFF ($-8191$ to $+8191$). This value defines the output value frequency as $$f_o = N \times \frac{f_s}{2^{16}}$$

where $f_s$ is the switch rate.

Apart from the input data file, the memory map shown in FIG. 7 indicates that 256 bytes are provided for storing the program, another 256 bytes store the cosine look-up table and a further 256 bytes are provided by the internal RAM of the microprocessor, which locations are used in the performance of the calculations. In addition, the memory map includes six bytes forming an output data file and two bytes forming an event counter.

Flow diagrams of the calculations performed by the microprocessor are shown in FIGS. 5 and 6. The flow diagram A of FIG. 5 indicates the main loop of the program which periodically cause the calculation subroutine which is shown in the flow diagram of FIG. 6. The flow diagram B of FIG. 5 illustrates the program used to ascertain the microprocessor operation is synchronised and the values being calculated can be used to control the pulse width modulators.

The details of the program itself in the assembly language of the TMS 9995 microprocessor are given in Table 1 which is annotated to indicate the particular functions being performed by the operations.

FIG. 9 shows an example of typical width modulated pulses which would be produced by the microcomputer circuit for operating the switches S1 to S9 of the converter. The cycle time $T_c$ is 192 $\mu$s, resulting from the use of 2 MHz as the time base frequency, 8 bits to specify each switch pulse duration and the fact that the maximum duration for a switch pulse is $\frac{2}{3}$ of the cycle time. The maximum duration for a switch pulse is $2^8 = 256$ times 0.5 $\mu$s = 128 $\mu$s from which the cycle time $T_c = 192$ $\mu$s follows.

TABLE 1

```
*******************************************************************
*                                                                 *
*                                                                 *
*                    PROGRAM CONSTANTS                            *
*                                                                 *
*******************************************************************
*                                                                 *
*                    ABSOLUTE ADDRESSES                           *
*                                                                 *
PHI     EQU    >1000                                              *
FCONT   EQU    >1002                                              *
OUT1    EQU    >1800                                              *
OUT2    EQU    >1802                                              *
OUT3    EQU    >1804                                              *
*                                                                 *
*                    WORKSPACE POINTERS                           *
*                                                                 *
WP      EQU    >FOCO                                              *
WP2     EQU    WP+26                                              *
*                                                                 *
*                    WORKING REGISTER ADDRESSES                   *
*                                                                 *
W0      EQU    WP
R0LSB   EQU    WP+1
R4LSB   EQU    WP+9
R7LSB   EQU    WP+15
R8LSB   EQU    WP+17
R9LSB   EQU    WP+19
R10LSB  EQU    WP+21
*
*                    NUMERIC CONSTANTS
*
*
*******************************************************************
*******************************************************************
*                                                                 *
*                    REGISTER UTILISATION                         *
*                                                                 *
*WP NAME            WP 1 NAME
*
*                    R0     PHI,Q INPUT REGISTER
*                    R1     (1+PHI) COEFFICIENT
*                    R2     (1+PHI)*Q PRODUCT
*                    R3     (1-PHI) COEFFICIENT
*                    R4     (1-PHI)*Q PRODUCT
*                    R5     BL VECTOR STORAGE
PROD1   EQU   0     R6     MPYS DEST OP AND MSW RESULT REGISTER
PROD2   EQU   1     R7     MPYS LSW RESULT REGISTER
COEFF1  EQU   2     R8     (1+PHI)*Q STORAGE REGISTER
COEFF2  EQU   3     R9     (PHI-1)*Q STORAGE REGISTER
ANGLE   EQU   4     R10    ANGLE STORAGE REGISTER
*       EQU   5     R11    BL RETURN ADDRESS REGISTER
*       EQU   6     R12    CRUBASE
TEMP    EQU   7            TEMPORARY STORAGE REGISTER
ACCUM1  EQU   8            OUTPUT ACCUMULATOR REGISTER 1
```

```
ACCUM2  EQU   9              OUTPUT ACCUMULATOR REGISTER 2
ACCUM3  EQU   10             OUTPUT ACCUMULATOR REGISTER 3
RETN    EQU   11             INDEXING REGISTER
UPDATE  EQU   12             INDIRECT ADDRESS STORAGE
*
*                    WP2 NAMES
*
LOKFLG  EQU   13    R0       LOCK STATUS FLAG
DIFF    EQU   14    R1       (WO-WI)T   STORAGE
SUM     EQU   15    R2       (-WO-WI)T  STORAGE
*R3                 R3       (WI*T)     STORAGE
*R4                 R4       (WI*T)     INCREMENT STORAGE
*R5                 R5       (WO*T)     STORAGE
*R6                 R6       (WO*T)     INCREMENT STORAGE
*R7                 R7       INTERRUPT WORKING REGISTER
*       AORG  0
        DATA  WP,START           RESET VECTOR
        DATA  WP2,ZERO           INTERRUPT VECTOR
START   LIMI  1                  SET INT. MASK TO ONE
        CLR   R2                 INIT. R2
        CLR   R3                 INIT. R3
        IDLE                     WAIT FOR INTERRUPT
        CLR   R13                CLEAR LOCK FLAG
        LWPI  WP2                SELECT WORKSPACE 2
        CLR   R7                 CLEAR ROLLING ERROR REG.
        LI    R4,>2AF            LOAD 55HZ CENTRE FREQUENCY
        LWPI  WP-12              SELECT UPDATE WORKSPACE
***********************************************************
***********************************************************
*                                                         *
*                  UPDATE ROUTINE                         *
*                                                         *
***********************************************************
BEGIN   CLR   R12                ZERO CRUBASE                      4
        LI    R5,CALC            LOAD BL VECTOR                    5
        TB    0                  TEST UPDATE INPUT                 9
        JEQ   END1               SKIP IF HIGH                      4
        MOV   @PHI,R0            READ (PHI),(Q)                    4
        LI    R1,>7F00           LOAD WORK CONSTANT (1)            5
        MOV   R1,R3              COPY TO R3                        4
        AB    R0,R1              MAKE (PHI+1) IN MSB R1            4
        BL    *R5                BRANCH TO CALCULATE PROG.         7
*                                                         TOT=    47
        SB    R0,R3              MAKE (1-PHI) IN MSB R3            4
        MOVB  R12,R0             MASK PHI                          4
        MPY   R0,R1              PRODUCE (Q)*(PHI+1) IN R1        24
        BL    *R5                BRANCH TO CALCULATE PROG.         7
*                                                         TOT=    39
        MOV   R1,R8              COPY (Q)*(PHI+1) TO R2(WP)        4
        MPY   R0,R3              PRODUCE (Q)*(1-PHI) IN R3        24
        MOV   R3,R9              COPY (Q)*(1-PHI) TO R3(WP)        4
END1    BL    *R5                BRANCH TO CALCULATE PROG.         7
*                                                         TOT=    39
        TB    0                  TEST UPDATE INPUT                 9
        JEQ   END2               SKIP IF HIGH                      4
        MOV   @FCONT,@WP+26+12   READ FREQUENCY CONTROL REG        5
END2    BL    *R5                BRANCH TO CALCULATE PROG.         7
        JMP   BEGIN              START UPDATE AGAIN                4
*                                                         TOT=    29
```

```
*                                                                    *
*              START OF CALCULATION ROUTINE                          *
*                                                                    *
**********************************************************************
*                                                                    *
*   THE CODE THEN HAS TO UPDATE THE INPUT AND OUTPUT PHASE            *
*   INFORMATION FOR THE NEXT INTEGRATION PERIOD.                      *
*                                                                    *
**********************************************************************
*
CALC    LWPI  WP+26            SELECT UPPER WORKSPACE            5
        A     R4,R3            INCREMENT (WI*T)                  5
        A     R6,R5            INCREMENT (WO*T)                  5
        MOV   R5,R1            COPY (WO*T) TO R1                 4
        MOV   R5,R2            COPY (WO*T) TO R2                 4
        NEG   R2               PUT -(WO*T) IN R2                 4
        S     R3,R1            MAKE (WO-WI)*T IN R1              5
        S     R3,R2            MAKE (-WO-WI)*T IN R2             5
        LWPI  WP               SELECT LOWER WORKSPACE            5
        LI    R4,>800          LOAD TABLE START ADDRESS          5
        LI    R12,R4LSB        LOAD INDIRECT ADDRESS             5
        MOVB  R14,*R12         CONCATENATE (WI-WO)T & TABLE      6
*                                                      TOT=     53
*
**********************************************************************
**********************************************************************
*                                                                    *
*    THE FINAL PULSE WIDTH VALUES ARE CALCULATED FROM                 *
*PARTIAL RESULTS DESIGNATED 1,2,3,4,5&6.  THESE RESULTS ARE           *
*EVALUATED FROM THE FOLLOWING EQUATIONS.                              *
*                                                                    *
*     1=((PHI+1)*Q)*COS(WO-WI)T                                       *
*     2=((PHI+1)*Q)*COS(WO-WI)T-2/3PI                                 *
*     3=((PHI+1)*Q)*COS(WO-WI)T-4/3PI                                 *
*     4=((1-PHI)*Q)*COS(-WO-WI)T                                      *
*     5=((1-PHI)*Q)*COS(-WO-WI)T-2/3PI                                *
*     6=((1-PHI)*Q)*COS(-WO-WI)T-4/3PI                                *
*                                                                    *
**********************************************************************
        LI    R8,>7F7F         LOAD OFFSET INTO ACCUMULATOR5
        MOV   R8,R9            LOAD OFFSET INTO ACCUMULATOR4
        LI    R7,>5500         STORE 2/3PI IN R7                 5
        LI    R11,R8*2+WP      LOAD OUTPUT ACCUM. ADDRESS        5

*                                                      TOT=     19
**********************************************************************
*                                                                    *
*              RESULT COMPLETION ROUTINE                              *
*                                                                    *
*  THIS ROUTINE COMPUTES THE PULSE WIDTH VALUES S1,S2,S4,S5           *
*  S7 & S8 FROM THE PARTIAL RESULTS 1,2,3,4,5,&6.  THE DATA           *
*  IS FORMATTED AS SHOWN BELOW.                                       *
*                                                                    *
*                  MSB    /    LSB                                    *
*            R8     1     /     2                                     *
*            R9     3     /     4     INITIAL FORMAT                  *
*            R10    5     /     6                                     *
*                                                                    *
*            R7     1     /     2     SAVED RESULTS                   *
```

```
*                                                                            *
*           R8      S1=1+4     /    S2=2+5                                   *
*                                                                            *
*                                                                            *
*           R9      S7=2+6     /    S8=3+4    COMPLETED VALUES               *
*           R10     S4=3+5     /    S5=6+1                                   *
*                                                                            *
*                                                                            *
*****************************************************************************
        MOV   R8,R7                   COPY TO WORKING REGISTER        4
        LI    R11,R8*2+WP             LOAD OUTPUT ACCUM. START ADDS
        AB    @R9LSB,*R11+            MAKE S1  (4+1)                  10
        AB    R10,*R11+               MAKE S2  (5+2)                   8
        AB    *R11+,*R11+             MAKE S8  (3+4)                  11
        AB    R9,*R11+                MAKE S4  (3+5)                   8
        MOVB  @R10LSB,R9              COPY (6)   TO R9 MSB             5
        AB    R7,*R11                 MAKE S5  (1+6)                   6
        AB    @R7LSB,R9               MAKE S7  (6+2)                   7
*                                                                TOT= 64
*****************************************************************************
        CLR   R0                      INITIALISE REGISTER              4
        MOVB  *R4,R0                  LOOKUP COS(WO-WI)T               5
        DATA  >1C2                    MPYS 2 PRODUCE (1)              26
        AB    @R0LSB,*R11+            ADD RESULT TO ACCUMULATOR        ?
*
        SB    R7,*R12                 MAKE (WO-WI)T-2/3PI IN R4        6
        CLR   R0                      INITIALISE REGISTER              4
        MOVB  *R4,R0                  LOOKUP COS(WO-WI)T-2/3PI         5
        DATA  >1C2                    MPYS 2 PRODUCE (2)              26
        AB    @R0LSB,*R11+            ADD RESULT TO ACCUMULATOR        ?
*
        SB    R7,*R12                 MAKE (WO-WT)T-4/3PI IN R4        6
        CLR   R0                      INITIALISE REGISTER              4
        MOVB  *R4,R0                  LOOKUP COS(WO-WI)T-4/3PI         5
        DATA  >1C2                    MPYS 2 PRODUCE (3)              26
        AB    @R0LSB,*R11+            ADD RESULT TO ACCUMULATOR        9
*                                                                TOT=141
        MOVB  R15,*R12                CONCAT.  (-WI-WO)T & TABLE       6
*
        CLR   R0                      INITIALISE REGISTER              4
        MOVB  *R4,R0                  LOOKUP COS(-WO-WI)T              5
        DATA  >1C3                    MPYS 3 PRODUCE (4)              26
        MOVB  @R0LSB,*R11+            COPY RESULT TO ACCUMULATOR       9
*
        SB    R7,*R12                 MAKE (-WO-WI)T-2/EPI IN R4       6
*
        CLR   R0                      INITIALISE REGISTER              4
        MOVB  *R4,R0                  LOOKUP COS(-WO-WI)T-2/3PI        5
        DATA  >1C3                    MPYS 3 PRODUCE (5)              26
        MOVB  @R0LSB,*R11+            COPY RESULT TO ACCUMULATOR       9
*
        SB    R7,*R12                 MAKE (-WO-WI)T-4/EPI IN R4       6

DLR   R0                      INITIALISE REGISTER              4
        MOVB  *R4,R0                  LOOKUP COS(-WO-WI)T-4/3PI        5
        DATA  >1C3                    MPYS 3 PRODUCE (6)              26
        MOVB  @R0LSB,*R11+            COPY RESULT TO ACCUMULATOR       9
*
*****************************************************************************
```

```
****   *********  *****************************    ************
*                                                               *
*                    DATA OUTPUT ROUTINE                        *
*                                                               *
****  **********************************************************
       LI    R11,OUT1         LOAD OUTPUT CHIP ADDRESS      5
       MOV   R8,*R11+         OUTPUT S1,S2                  8
       MOV   R13,R13          LOCK FLAG SET?                4
       JEQ   NOLOAD           SKIP IF NOT                   4
       MOV   R10,*R11+        OUTPUT S4,S5                  8
       MOV   R9,*R11+         OUTPUT S7,S8                  8
NOLO   LWPI  WP-12            SELECT UPDATE WORKSPACE       5
       RT                                                   5
*                                                     TOT= 47
*****************************************************************
*                                                               *
*                    INTERRUPT ROUTINE                          *
*                                                               *
*    THIS ROUTINE PERFORMS THE PHASE LOCK FUNCTION              *
*    REQUIRED FOR PRODUCTION OF THE SUPPLY VOLTAGE PHASE        *
*    INFORMATION.                                               *
*    THIS IS ACHIEVED BY EXAMINING THE VALUE CONTAINED IN       *
*    THE (WI*T) STORAGE REGISTER WITH A ZERO CROSSING           *
*    INTERRUPT. WHEN IN LOCK THIS VALUE SHOULD BE CLOSE         *
*    TO ZERO. THE ERROR IS ADDED TO THE PREVIOUS ERROR AND      *
*    DIVIDED BY TWO TO PRODUCE A ROLLING AVERAGE ERROR          *
*    W  CH IS THEN USED TO MODIFY THE ANGLE INCREMENT.          *
*    E   IRING THAT THE ERROR IS SMALLER AT THE TIME OF THE     *
*    N    INTERRUPT. THE ERROR SHOULD THUS TEND TOWARDS ZERO    *
*    A    R A NUMBER OF INTERRUPTS. WHEN THE ERROR IS LESS      *
*    T    +/- 2 THE SYSTEM IS DECLARED IN LOCK AND THE FLAG     *
*    S    CONVERSELY IF THE ERROR IS GREATER THAN +/- 2         *
*    T    FLAG IS RESET.                                        *
*    T    ANGLE COUNT IS RESET TO ZERO AFTER THE ABOVE          *
*    P    ESSING.                                               *
*                                                               *
*****************************************************************
*                                                              14
ZERO   SRA   R3,8             DIVIDE ERROR BY 256          14
       A     R3,R7            ADD TO PREVIOUS ERROR         5
       SRA   R7,1             DIVIDE BY TWO FOR MEAN ERROR  7
       S     R7,R4            MODIFY INCREMENT              5
       ABS   R3               MAKE ERROR POSITIVE           4
       CLR   R0               CLEAR LOCK FLAG               4
       CI    R3,4             IN LOCK?                      6
       JGT   NOLOK            EXIT WITH FLAG CLEARED        4
       SETO  R0               SET LOCK FLAG                 4
NOLOK  CLR   R3               CLEAR ANGLE COUNT             4
       RTWP                                                 7
       END
```

Although the invention has been described with reference to a specific embodiment it will be appreciated that many other embodiments are possible. For example, the input supply may have more than three phases and the output supply may be d.c. or a.c. of any number of phases. Moreover, the various clock and switching frequencies may be modified to suit other embodiments and applications.

What is claimed is:

1. A direct A.C. to A.C. supply Converter having: input conductors for a balanced polyphase A.C. input supply system; output conductors for an A.C. supply system; a plurality of bidirectional switches for individually connecting each input conductor to each output conductor; and a control means connected to operate the switches, said control means including: a data processor means programmed to produce numerical value signals representing widths of width modulated pulses; circuit means for deriving timing signals from the input supply system and applying them to the data processor means for determining the timing of said width modulated pulses; and pulse generator means for receiving and responding to said numerical value signals to operate said switches by generating a repeating sequence of abutting pulses width modulated according to said numerical values and having durations shorter than the periods of the A.C. input and output supply systems; said data processor means applying said numerical value signals to said pulse generator means so that (1) for each output conductor the switches connected to that output conductor are rendered conducting in a repeating sequence by and for the durations of the width modulated pulses applied thereto; (2) each phase of the input supply system is connected in turn to each output phase of the output system; and (3) at any instant only one of said switches connected to each of the output conductors is conductive.

2. A converter according to claim 1, wherein said control means applies said sequence of width modulated pulses repetitively at a constant frequency.

3. A converter according to claim 2, wherein data processor means calculates the values for all but one pulse in each sequence and wherein said pulse generator means produces the remaining pulse in each respective sequence to fill the period of the constant frequency.

4. A converter according to claim 1, wherein the circuit means for deriving the timing signals is responsive to the waveform of the voltage on a single input conductor for producing an output pulse when the voltage waveform crosses a particular voltage level.

5. A converter according to claim 4, wherein the particular voltage level is zero.

6. A converter according to claim 1, wherein said circuit means is connected to apply said timing pulses to an interrupt input of the data processor means to initiate a program for synchronizing the operation of the data processor means with the instants of the voltage waveform on one of the input conductors crossing a particular voltage level.

7. A converter according to claim 6, wherein the synchronizing program is a digital phase locked loop program routine.

8. A converter according to claim 7, wherein the phase locked loop program routine includes the steps of examining a stored digital value representing the input supply phase at the time of the interrupt, forming the average of the value and the corresponding value at the previous interrupt and modifying the stored digital value so as to tend to bring it into agreement with the input supply phase.

9. A converter according to claim 1, wherein the pulse generator means includes
means for monitoring the conductive states of the bidirectional switches and
interlocking circuit means responsive to the monitoring means for controlling the operation of the switches so that the turning on of a particular switch coincides with the turning off of the previously conducting switch.

10. A converter according to claim 1, wherein the pulse generator means includes an overload detection circuit having means for comparing the period of time taken for each switch to turn on fully, with a preset value; and means for turning off all of the switches if the period of time for any switch exceeds the preset value.

11. A converter according to claim 1, wherein the control means includes a default logic circuit responsive to converter operation failure likely to prevent the correct operation of the pulse width modulators to feed equal values to all the pulse width modulators so that the width modulated pulses are all of equal duration.

12. A converter according to claim 1, wherein the data processor means is programmed to calculate the values of the pulse widths as on a real-time basis.

13. A converter according to claim 1, wherein the data processor means is programmed to calculate the values of the pulse widths in advance for a whole cycle of the A.C. input supply.

14. A direct A.C. to A.C. supply converter having
input conductors for a balanced polyphase A.C. input supply system,
output conductors for an A.C. output supply system,
a plurality of bidirectional switches for individually connecting each input conductor to each output conductor, and
a control means for operating the switches by application of a repeating sequence of abutting width modulated pulses having durations shorter than the periods of the A.C. input and output supply systems, there being the same number of pulses in the sequence as there are phases in the input supply, such that each phase of the input supply is connected in turn to each phase of the output supply and that at any instant one and only one of the switches connected to each of the output conductors is closed,
wherein the control means includes a data processor means programmed for generating a sequence of numerical value signals representing the widths of the modulated pulses,
pulse generator means for receiving and responding to the numerical value signals for producing the width modulated pulses and applying them to operate the switches individually such that a switch is operated for the duration of each width modulated pulse applied thereto,
and means connected to the input conductors for deriving timing signals from the A.C. input supply system and for applying said timing signals as interrupt signals to the data processor means to initiate a synchronising program for matching the timing of the sequence of numerical value signals to the A.C. input supply.

15. A converter according to claim 14, wherein the circuit means for deriving timing signals is responsive to the waveform of the voltage on a single input conductor for producing a timing pulse when the voltage waveform on that single conductor crosses a particular voltage level.

16. A converter according to claim 15, wherein the particular voltage level is zero.

17. A converter according to claim 15, wherein the synchronizing program is a digital phase locked loop program routine including the steps of examining a stored digital value representing the input supply phase at the time of the interrupt, forming the average of the value and the corresponding value at the previous interrupt and modifying the stored digital value so as to tend to bring it into agreement with the input supply phase.

18. A converter according to claim 17, wherein the pulse generator means includes
   means for monitoring the conductive states of the bidirectional switches and
   interlocking circuit means responsive to the monitoring means for controlling the operation of the switches so that the turning on of a particular switch coincides with the turning off of the previously conducting switch.

19. A converter according to claim 14, wherein the synchronizing program is a digital phase locked loop program routine including the steps of examining a stored digital value representing the input supply phase at the time of the interrupt, forming the average of the value and the corresponding value at the previous interrupt and modifying the stored digital value so as to tend to bring it into agreement with the input supply phase; and wherein the control means includes a default logic circuit responsive to a converter operation failure likely to prevent the correct operation of the pulse width modulators to feed equal values to all the pulse width modulators so that the width modulated pulses are all of equal duration.

20. A converter according to claim 19, wherein the pulse generator means includes an overload detection circuit having means for comparing the period of time taken for each switch to turn on fully, with a preset value; and means for turning off all of the switches if the period of time for any switch exceeds the preset value.

* * * * *